2 Sheets--Sheet 1.

F. B. WILLIAMS.
Boring-Attachments for Lathes.

No. 138,460. Patented April 29, 1873.

Witness:
Jas. C. Hutchinson
C. L. Everts

Inventor.
F. B. Williams.
per
Saunders & Mason,
Attorneys.

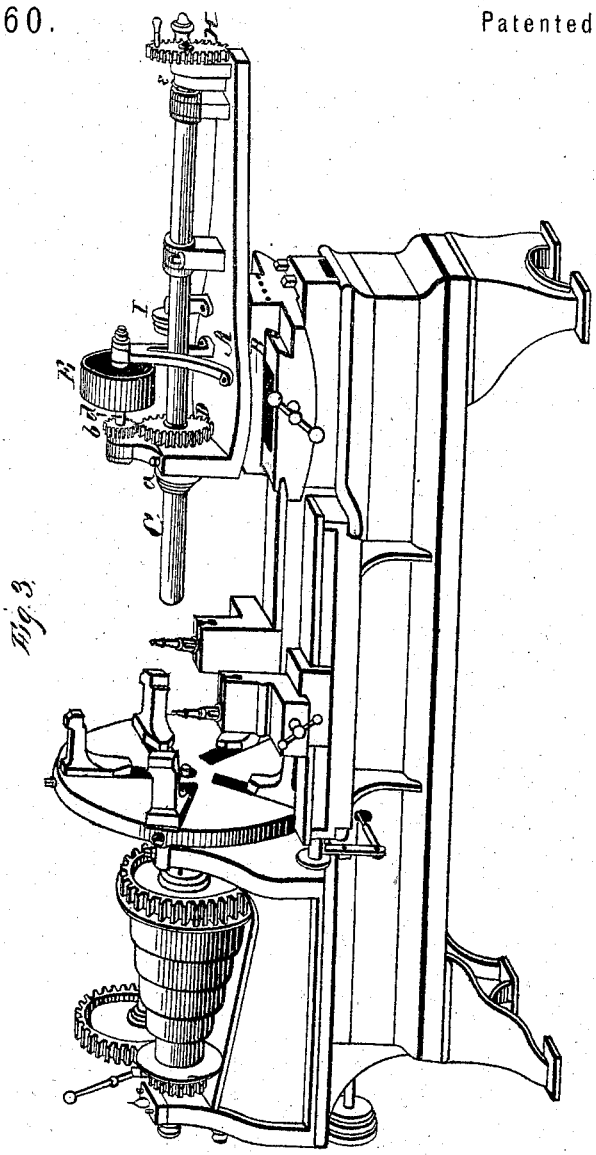

UNITED STATES PATENT OFFICE.

FITZALLAN B. WILLIAMS, OF STERLING, ILLINOIS.

IMPROVEMENT IN BORING ATTACHMENTS TO LATHES.

Specification forming part of Letters Patent No. 138,460, dated April 29, 1873; application filed January 24, 1873.

*To all whom it may concern:*

Be it known that I, F. B. WILLIAMS, of Sterling, in the county of Whitesides and in the State of Illinois, have invented certain new and useful Improvements in Pulley-Turning Machine; and do hereby declare that the following is a full, clear, and exact description thereof, reference being had to the accompanying drawing and to the letters of reference marked thereon, making a part of this specification.

My invention is intended as an attachment to machines for turning pulleys; and it consists in a revolving boring-spindle, with suitable self-feeding mechanism for boring pulleys at the same time they are being turned, as will be hereinafter more fully set forth.

In order to enable others skilled in the art to which my invention appertains to make and use the same, I will now proceed to describe its construction and operation, referring to the annexed drawing, in which—

Figure 1:
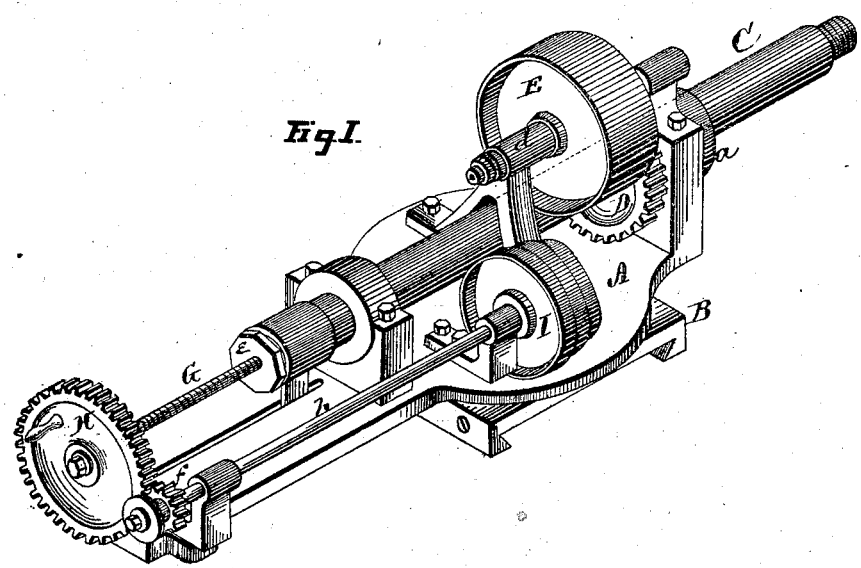
Figure 2:
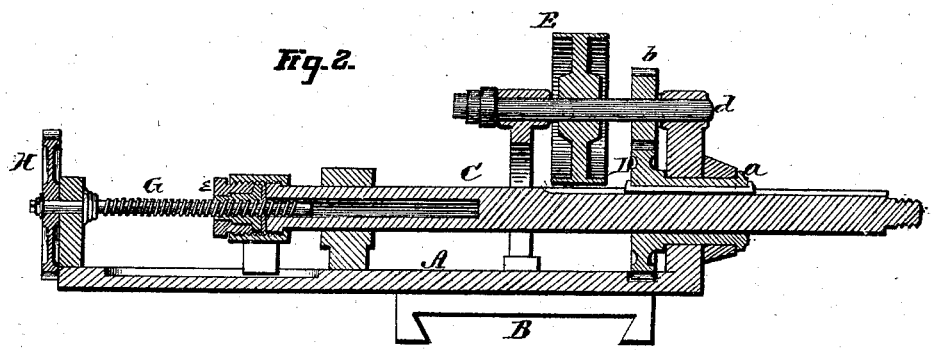

Figure 1 is a perspective view, and Fig. 2 a longitudinal vertical section, of my attachment for machines for turning pulleys. Fig. 3 is a perspective view, showing a pulley-turning machine or lathe, with my boring attachment in position on the same.

A represents the bed-plate attached to a slide, B, and provided with suitable standards to form or hold bearings for the various shafts of my machine. C represents the boring bar or spindle which passes through and is feathered in a sleeve, $a$, passing through the standard at the inner end of the bed-plate. On the sleeve $a$ is a cog-wheel, D, which gears with a pinion, $b$, on a counter-shaft, $d$, and on said counter-shaft is a pulley, E. On the inner end of the bar or spindle C is attached a nut, $e$, through which passes a screw, G, the inner end of the spindle C being hollow to admit of the entrance of said screw. On the outer end of the screw G is a cog-wheel, H, which gears with a pinion, $f$, on a counter-shaft, $h$, and this shaft provided with suitable pulleys I.

A pulley-turning machine consists of an ordinary iron turning-lathe, only it is provided with two slide-rests and two tool-stocks, and a universal chuck, as shown in Fig. 3. The boring attachment occupies the same position as the tail-stock in ordinary iron lathes. The pulley is placed on the chuck, centered and fastened firmly to the same. Then the operation of turning and boring is commenced; two tools are employed for turning, each being set to the center and fed toward the edge. While these tools are doing their work on the periphery of the pulley, the boring attachment is doing its work, the boring-bar or spindle C being driven by a belt from counter-shaft overhead, and fed automatically by a belt around the pulley I on the shaft $h$. The boring-tools are screwed onto the end of the bar or spindle and consist of a round bar with mortise through it to admit the cutter, which bores the hole true, and the hole is finished with a fluted reamer screwed on the end of the spindle.

This attachment may be applied to a vertical pulley-turning machine just as well as to a horizontal.

Having thus fully described my invention, what I claim as new, and desire to secure by Letters Patent, is—

The combination of the bed-plate A with standards, boring-spindle C, sleeve $a$, nut $e$, screw G, countershafts $d$ $h$ with pulleys E I, respectively, and the gears D $b$ and H $f$, all constructed and arranged to operate substantially as and for the purposes herein set forth.

In testimony that I claim the foregoing I have hereunto set my hand this 7th day of January, 1873.

F. B. WILLIAMS.

Witnesses:
W. S. STOCKING,
W. H. KREIDER.